May 24, 1955 L. C. HOLMES 2,709,204

RECORDING AND REPRODUCING APPARATUS AND METHODS

Filed Oct. 28, 1949

INVENTOR.
Lynn C. Holmes
BY T. L. Bowes
Att'y 2,709,204

RECORDING AND REPRODUCING APPARATUS AND METHODS

Lynn C. Holmes, Fairport, N. Y., assignor to Stromberg-Carlson Company, a corporation of New York Application October 28, 1949, Serial No. 124,173

13 Claims. (Cl. 179—100.2)

Figures 1, 2, 3:
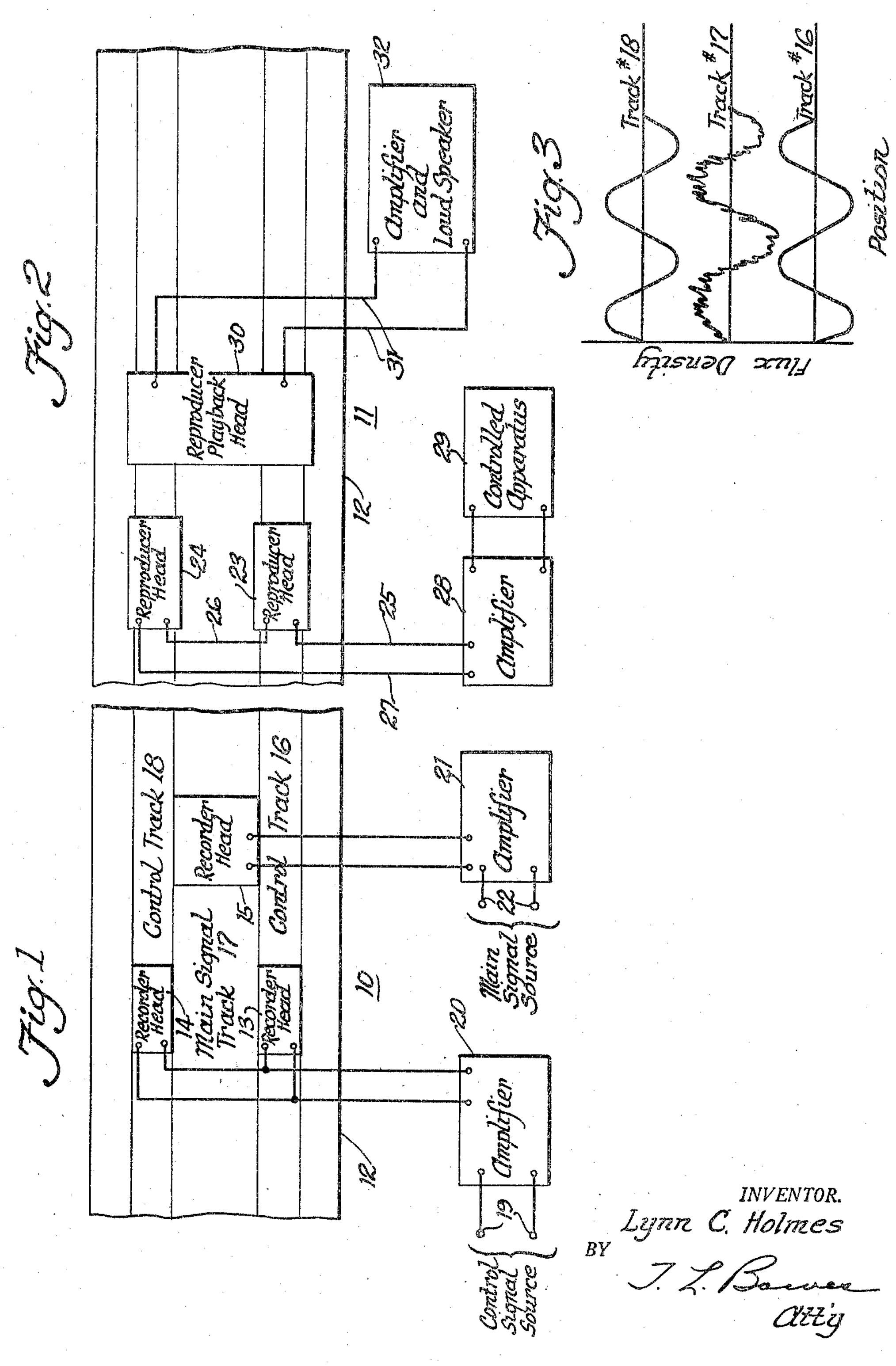

This invention relates to recorder-reproducers, more particularly to magnetic recording and reproducing apparatus and methods wherein a plurality of signals may be recorded upon and reproduced from a single record medium, and the invention has for an object the provision of an expensive and reliable apparatus and methods of this character.

While the invention is not limited thereto and may be employed in the recording and reproducing of a plurality of signals of various characters, it is particularly applicable to and is herein disclosed as applied to the simultaneous recording and reproducing on a single record medium of a main signal and an auxiliary or control signal. It has heretofore been proposed in connection with magnetic tape recorders to record a speed control signal, for example, on the edge of the tape in addition to the main or speech signal, and to separate the two signals during playback by means of suitable filter circuits. Such filter circuits add to the expense and complexity of the equipment, and when relatively low frequencies are employed for the control signal, it is often necessary to provide high permeability keepers in order to prevent spreading of the magnetic control field. It is a further object of the invention, therefore, to provide improved apparatus and methods of the above character in which the necessity for filter circuits and magnetic keepers is eliminated.

In carrying out the invention in one form, a recorder-reproducer is provided which includes means for recording on a single record medium, such, for example, as a magnetizable tape, a pair of identical signals of opposite polarity and a third signal. In order to separate out the signals during playback, reproducing means are provided connected in series opposition and associated with the record medium so as respectively to reproduce the pair of opposite polarity signals and combine these signals in properly poled relation, the connection of the reproducing means in series opposition being effective to cancel out components of the third signal, and other reproducing means are provided associated with the recording medium so as to reproduce primarily the third signal, the effects of the opposite polarity signals on such other reproducing means being cancelled therein due to the opposite polarity. More particularly, the recording means includes three recorder heads, two of which are energized in opposed polar relation from one source of energy, for example the control signal source, so as to provide two tracks which are preferably spaced apart on the magnetizable tape and constitute identical records of opposite polarity, and the third head is connected to another signal source and arranged to produce a signal record on the magnetizable tape which constitutes a third track disposed intermediate the spaced tracks. Similarly the reproducing means includes three reproducer heads, two of which are arranged respectively to span the opposite polarity tracks and are connected in series opposition so as to combine the signals produced therein in proper polarity and to effect cancellation of any signals produced by the third track, while the other reproducer head is arranged to span primarily the third track so as to reproduce the signal therefrom and this head is arranged in symmetrical relation with the two opposite polarity tracks so that the magnetic fluxes therefrom will cancel out in the reproducer head.

For a more complete understanding of the invention, reference should now be had to the drawing, in which:

Figs. 1 and 2 respectively constitute diagrammatic representations of a magnetic tape type recorder and reproducer embodying the invention; and Fig. 3 is an explanatory diagram illustrating the magnetic flux density along a strip of magnetizable tape on which signals have been recorded in accordance with the present invention.

Referring now to the drawing, the invention is shown in Figs. 1 and 2 as embodied in a magnetic recorder-reproducer of the magnetic tape type comprising a recorder 10 and a reproducer 11. In Figs. 1 and 2 the strip of magnetizable tape on which the signals are to be recorded and from which the signals are to be reproduced is identified by the reference numeral 12, and since the usual mechanisms for driving and storing the tape both in the recorder and the reproducer are well known in the art, these mechanisms have not been illustrated in the drawings.

As shown in Fig. 1, the recorder 10 includes three recorder heads 13, 14 and 15 arranged with respect to the tape 12 so as to produce a plurality of record tracks 16, 17 and 18 therein, arranged in side-by-side relation. The recorder heads 13 and 14 for producing the record tracks 16 and 18 are connected, as shown in Fig. 1, for energization from a control signal source represented by the terminals 19 through a suitable amplifier 20, the connections being such that the recorder heads are oppositely polarized whereby records will be produced in the control tracks 16 and 18 representing identical signals of opposite polarity. As also shown in Fig. 1, the recorder head 15 is connected for energization through a suitable amplifier 21 from a main signal source represented by the terminals 22, the recorder head 13 thereby producing in the main signal track 17 a single record of the main signal.

In Fig. 3 the flux densities produced in the tracks 16, 17 and 18 by the recorder heads 13, 15 and 14, respectively, have been plotted against the position of the tape in order to indicate the opposite polarity of the signals in the tracks 16 and 18.

The reproducer 11 is provided, as shown in Fig. 2, with a pair of reproducer heads 23 and 24 which are respectively associated with the magnetized tape 12 so as to span the tracks 16 and 18 and accordingly the opposite polarity signals represented by the upper and lower curves in Fig. 3 will be reproduced in the heads 23 and 24. In accordance with the present invention, these reproducer heads are connected in series opposition by means of conductors 25, 26 and 27 so as to be additively combined and supplied as a single signal to a suitable amplifier 28, the output circuit of which is connected to the apparatus to be controlled, identified by the reference numeral 29. This controlled apparatus may, for example, constitute the speed control means for controlling the speed of the tape 12 during playback. It will be observed that due to the connection of the heads 23 and 24 in series opposition any signal produced in either of the heads 23 and 24 by the magnetic flux in track 17 will be cancelled out by the similar signal produced in the other one of the heads 23 or 24 by the same flux in track 17, the heads 23 and 24 being arranged symmetrically with respect to the signal track 17. Consequently the control signal will be reproduced and supplied to the controlled apparatus 29 free of any components of the main signal on track 17.

In order to reproduce the main signal, the reproducer 11 is provided with another reproducer head 30 which, as shown, may span all of the tracks 16, 17 and 18. Since any flux from the track 16, for example, will be cancelled out by an equal and opposite flux from the track 18, the reproducer head 30 will be affected only by flux from the main signal track 17 and therefore will reproduce the main signal free of any components of the control signal, and the main signal may be supplied through suitable conductors 31 to any suitable output device, such, for example, as the amplifier and loud speaker 32 indicated in Fig. 2.

It will thus be seen that a recorder-reproducer has been provided which is capable of recording two signals simultaneously on a single recording medium and separating or sorting out the signals during reproduction without resort to the usual filter circuits. If relatively low frequencies are employed for the control signal it will be found that the width of the signal track will be considerably greater than the width of the reproducer heads, but this spreading of the control signal magnetic fields will not affect the signal in the main reproducer head because of the fact that the two components of the control signal recording are of opposite sign and of equal magnitude. Similarly, as previously indicated, the reproducer heads 23 and 24, by reason of their connection in series opposition, reject any components of the main signal resulting from spreading of the main signal track 17. It will be understood, of course, that the reproducer head 30 need not necessarily span all of the signal tracks as shown in Fig. 2, it only being necessary that this reproducer head be disposed symmetrically with respect to the control tracks 16 and 18 so as to effect cancellation therein of the fluxes from these two tracks.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. A recorder-reproducer comprising means for recording simultaneously on a single record medium a pair of identical signals of opposite polarity and a third signal, said means being positioned such that said signals are recorded longitudinally on three separate tracks, a pair of separate reproducing means connected in series opposition and disposed adjacent to said record medium so as respectively to reproduce said pair of signals directly from said medium, and other reproducing means disposed adjacent to said record medium so as simultaneously to reproduce said third signal directly from said medium, the effects of said opposite polarity signals being effectively cancelled in said other reproducing means.

2. A recorder-reproducer comprising means for recording longitudinally on spaced apart tracks on an elongate record medium a pair of identical signals of opposite polarity, means for recording longitudinally a third signal on a track intermediate said spaced apart tracks, a pair of separate reproducing means connected in series opposition and respectively associated with said spaced apart tracks, and other reproducing means associated primarily with said intermediate track.

3. A magnetic recorder-reproducer comprising means for magnetically recording on an elongate magnetizable record medium a pair of identical signals of opposite polarity and a third signal, said means being positioned such that said signals are recorded longitudinally on three separate tracks, reproducing means including a pair of separate reproducer heads associated with said record medium so as to be respectively influenced primarily by the magnetic records of said pair of signals, means for connecting the output circuits of said reproducer heads in opposed series relation, and other reproducing means including a single reproducer head associated with said record medium so as to be primarily influenced by the magnetic record of said third signal, the influence of said magnetic records of said opposite polarity signals being effectively cancelled in said other reproducing means.

4. A tape recorder-reproducer comprising means for magnetically recording longitudinally on a pair of spaced apart tracks adjacent the opposite edges of a magnetizable tape a pair of identical signals of opposite polarity, means for magnetically recording longitudinally a third signal on said tape intermediate said tracks, a pair of reproducer heads respectively associated with said spaced apart tracks and having output circuits connected in series opposition, and a single reproducer head associated with said tape for reproducing said third signal and located symmetrically with respect to said spaced tracks.

5. A tape recorder-reproducer comprising means for magnetically recording longitudinally on a pair of spaced apart tracks adjacent the opposite edges of a magnetizable tape a pair of identical signals of opposite polarity, means for magnetically recording longitudinally a third signal on said tape intermediate said tracks, a pair of reproducer heads respectively associated with said spaced apart tracks and having output circuits connected in series opposition, whereby said pair of identical signals are additively combined and components of said third signal affecting said spaced heads are cancelled out, and a single reproducer head associated with said tape in symmetrical relation to the edges thereof for reproducing said third signal, the components of said pair of opposite polarity affecting said single reproducer head being effectively cancelled therein.

6. A recorder-reproducer comprising a source of control signal energy, a source of main signal energy, means for recording longitudinally said control signal energy in two distinct tracks on a single record medium to provide identical records of opposite polarity, means for recording longitudinally said main signal energy in a third track on said record medium, a pair of separate reproducing means connected in series opposition and respectively associated with said two tracks for reproducing said control signal energy while effectively cancelling components of said main signal energy, and other reproducing means associated with said record medium for reproducing said main signal energy from said third track while effectively cancelling opposite polarity components of said control signal energy.

7. A tape recorder-reproducer comprising a source of control signal energy, a source of main signal energy, a pair of oppositely poled recording heads energized from one source of energy for producing a pair of opposite polarity longitudinally recorded records extending along opposed edges of a single magnetizeable tape, a single recording head energized from the other source of energy for producing a longitudinally recorded record extending along said tape intermediate said opposite polarity records, and a pair of separate reproducing means associated with said tape, one of said reproducing means being effective to cancel components of said intermediate record while combining components of said opposite polarity records in additive relation, the other of said reproducing means being effective to reproduce the signal energy of said third record while combining in cancelling relation components of said opposite polarity records, whereby said control signal energy and main signal energy are reproduced.

8. A tape recorder comprising a pair of recording heads associated with a magnetizeable tape for producing longitudinally recorded records thereon along opposite edges of the tape, means for energizing said heads in reverse polarity relation from a first signal source, a third recording head associated with said tape for producing a longitudinally recorded record thereon substantially centrally thereof, and means for energizing said third head from a second signal source.

9. Apparatus for reproducing a pair of distinct signals from a record medium having thereon a pair of identical opposite polarity longitudinally recorded records of one of said signals and a single longitudinally recorded record of the other of said signals, said records being recorded on separate tracks comprising a pair of separate reproducing means associated with said record medium and connected in series opposition for reproducing said one signal from said opposite polarity records while cancelling out components of said other signal, and other reproducing means associated with said record medium for reproducing said second signal from said single record, said other reproducing means being symmetrically positioned relative to said opposite polarity records.

10. Apparatus for reproducing a pair of distinct signals from an elongate magnetic record medium having thereon a pair of opposite polarity longitudinally recorded records of one of said signals and a single longitudinally recorded record of the other of said signals, said records being recorded on separate tracks comprising a pair of reproducing heads associated with said magnetic record medium and connected in series opposition for reproducing said one signal from said opposite polarity records and cancelling out components of said other signal, and another reproducing head associated with said magnetic record medium for reproducing said second signal from said single record thereof, said other reproducing head being symmetrically positioned relative to said opposite polarity records to effect cancellation therein of components of said one signal.

11. Apparatus for reproducing a pair of distinct signals from a magnetic tape having a pair of opposite polarity longitudinally recorded records of one of said signals extending along spaced apart tracks on said tape, and a single longitudinally recorded record of the other of said signals extending along a track intermediate said spaced tracks, comprising a pair of reproducing heads associated with said spaced tracks on said tape so as respectively to reproduce opposite polarity signals from said opposite polarity records, means connecting said heads in series opposition for combining said opposite polarity signals in additive relation and cancelling components of said other signal reproduced by said heads from said single record, and another reproducing head associated with said tape and spanning said intermediate track and at least portions of said spaced tracks for reproducing said other signal, the relation of said other head to said spaced tracks providing for cancellation therein of the magnetic fluxes produced by said opposite polarity records.

12. The method of recording and reproducing a pair of distinct signals with a single record medium, which comprises producing a pair of identical longitudinally recorded records of opposite polarity from one of said signals and a single longitudinally recorded record on separate tracks of the other signal, producing signals of opposite polarity from said pair of records on a third track, combining said opposite polarity signals in reverse relation to reproduce said one signal and cancel out components of said other signal, and separately reproducing said other signal from said single record.

13. The method of recording and reproducing a pair of distinct signals with a single magnetizeable tape which comprises simultaneously recording longitudinally one of said signals on two tracks to produce identical records on said tape of opposite polarity, recording longitudinally the other signal on a single track on said tape, producing signals of opposite polarity from said opposite polarity records, combining said opposite polarity signals in reverse relation to reproduce said one signal and cancel out components of said other signal, and separately reproducing said other signal from said single track record.

References Cited in the file of this patent

UNITED STATES PATENTS

| | | |
|---|---|---|
| 699,630 | Pedersen | May 6, 1902 |
| 1,943,630 | Schwartzkopf | Jan. 16, 1934 |